United States Patent [19]
Benson

[11] 3,818,708
[45] June 25, 1974

[54] FLOATING BARRIER
[75] Inventor: Robert A. Benson, Cohasset, Mass.
[73] Assignee: Submarine Engineering Associates, Inc., Cohasset, Mass.
[22] Filed: Feb. 2, 1972
[21] Appl. No.: 222,867

[52] U.S. Cl. .................................................. 61/1 F
[51] Int. Cl. ........................................... E02b 15/04
[58] Field of Search .................................. 61/1 F, 5

[56] References Cited
UNITED STATES PATENTS
| 3,184,923 | 5/1965 | Galvaing | 61/1 F |
| 3,592,006 | 7/1971 | Crucet | 61/1 F |
| 3,685,296 | 8/1972 | Bogosian | 61/1 F |

FOREIGN PATENTS OR APPLICATIONS
| 77,350 | 3/1960 | France | 61/1 F |
| 739,171 | 10/1932 | France | 61/1 F |

Primary Examiner—Peter M. Caun

[57] ABSTRACT

A floating barrier capable of permanently enclosing an area at sea is made up of sections each comprising a solid vertical dam with stiffening ribs and substantially continuous flotation extending laterally from opposite sides of the dam, the floatation preferably being foam filled tubes, adjacent sections of the barrier preferably being hinged to each other.

12 Claims, 8 Drawing Figures

PATENTED JUN 25 1974 3,818,708

FLOATING BARRIER

BACKGROUND OF THE INVENTION

1. Field of the Invention

This invention relates to floating barriers capable of enclosing an area at sea, e.g., to contain an actual or potential oil spill.

2. Description of the Prior Art

Many floating oil barrier devices have been developed in the past. Generally, they are light-weight deployable booms designed for clean-up purposes after an oil spill occurs. In some cases emergency or clean-up type barriers or booms are routinely deployed under piers and around a tanker after the vessel has tied-up. These booms are generally composed of light bag-like flotation, foam cylinders, or foam blocks which support thin sheet dams or curtains composed of various materials such as thin rubber, vinyl, coated fabrics, asbestos, wood or similar materials. They are joined with a variety of bolting, pinning, or snap systems. In most cases weights, cables, chains or a combination of these is added along the bottom, to provide the longitudinal tensile strength and some stability for the boom.

Several high seas models of floating booms have also been developed. These are generally similar in construction to those noted above except that they are significantly larger.

Since oil and other floating materials tend to build up against the boom, the draft of the barrier must be adequate to prevent underflow under most expected conditions. Additionally, the above water portion of the boom or barrier, the free board, must be high enough to prevent lapping or splashing over of the pollutant material by normally expected wave or wind action. The smoothing effect of oil on water does alleviate the splashing and lapping problem somewhat. Accordingly, in order to give maximum protection the dam or vertical barrier should have significant stability particularly in wind or current conditions when build up of oil or other material is most prevalent. If a boom lays over as a result of wind or current pressure its ability to contain floating materials is greatly reduced. If a boom dips, buckles, or twists it can release or fail to contain large amounts of pollutant. Tears, leaks or breaks in a boom will also greatly reduce or completely negate its effectiveness.

There is a serious need for an oil and other floating pollutant barrier which is strong enough to remain stable and functional in a practical variety of configurations over an extended period of time while constantly in the water.

SUMMARY OF THE INVENTION

The present invention provides a durable, stable oil containment boom which will remain functional at all times for extended periods of time. It has sufficient buoyancy and stability to permit the attachment of secondary systems such as hoses, small boats, ancillary clean-up devices, and the like, while still being sufficiently flexible to withstand shocks and strain without damage. Sections can be quickly connected or released without tools for emergency purposes, and a positive seal is maintained between sections. Convenient lifting points are provided at frequent intervals along the boom for handling of the boom and for use by clean-up personnel in tying-off clean-up equipment and boats as well as for a steadying point for personnel working near the boom. End connections seal the barrier to the pier or other permanent structure while allowing for vertical tide and wave action as well as providing a connecting/disconnecting terminal for normal opening and closing of the boom. The boom will not interfere with or damage a ship or tow boat operating in its vicinity; e.g., there are no cables, lines or chains to foul ship propellers and shafts.

In general the invention features a floating barrier section comprising a solid vertical dam, and floats extending laterally from opposite sides of the dam, the floats being of overall width, taken together, between one-fourth and two-thirds the height of the dam and greater than their own height, the dam being constructed of a material having Shore A scale durometer hardness between 60 and 90, the barrier section having its center of gravity below its center of buoyancy, and having at least one end constructed and arranged for connection to an adjacent section. In preferred embodiments the dam is of polyurethane material and has an increased average weight density in its lower 20 percent; the floats are D-shaped foam filled tubes which extend continuously substantially (at least 99 percent) the length of the barrier section to provide maximum strength and continuity; vertical stiffening ribs of less flexibility than the dam provide rigidity; adjacent sections are hinged to each other with plastic pins; at least one-fourth of the height of the dam extends above the floats; and the buoyancy and weight of the barrier are related so that in water at least 50 percent of the height of the floats will be submerged.

Other advantages and features of the invention will be apparent from the description and drawings herein of a preferred embodiment thereof.

DESCRIPTION OF THE PREFERRED EMBODIMENT

Figures 4, 5:
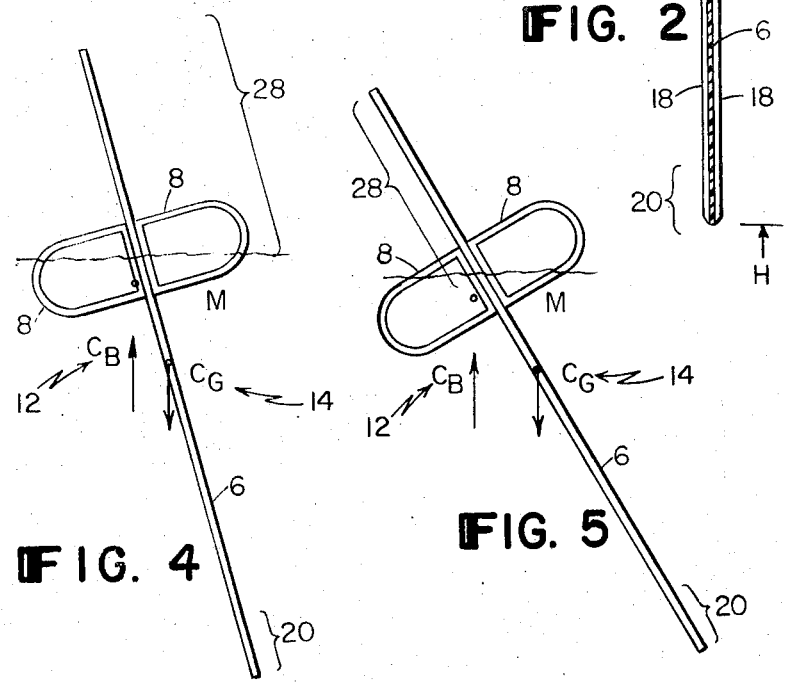
FIG. 3–5 are diagrammatic views similar to FIG. 2 and illustrate the relative positions of the center of buoyancy and the center of gravity various positions of the boom.
Figure 3:
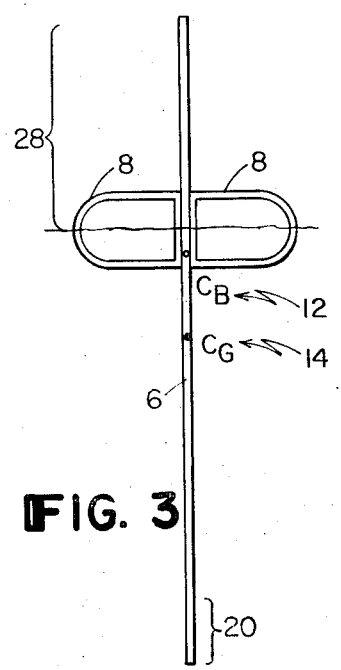

Referring to FIGS. 1–5, a typical boom section 1 consists of a vertical dam 6 sandwiched between two D-shaped flotation tubes 8. The overall width $W$ of tubes 8 is one-fourth to two-thirds (preferably one-third) the overall height $H$ of the dam, and is greater than the height h of the tubes (preferably $W = 3h$). As a result, the center of buoyancy 12 as illustrated in FIGS. 3–5 moves significantly towards the outboard side of the flotation tubes 8 when the boom tilts about an axis approximately through the geometric center of the tubes. The weight distribution yields a center of gravity 14 located below the bottom of tubes 8 and below the center of buoyancy 12. One fourth to one half of the height of dam 6 extends above tubes 8 to provide an above water barrier.

As the boom tilts or heels about its rotational axis the righting moment and metacentric height increase substantially since the center of buoyancy moves significantly towards the tilted down side of the tubes.

Since the formulation of the basic dam 6 and tubes 8 yields a specific gravity of at least 1.2 and is generally one-fourth inch or greater in thickness thereby resulting in a weight of greater than 10 pounds per linear foot for a three foot dam, not only is the center of gravity 14 at a point below the center of buoyancy 12 but the magnitude of the righting moment is significant.

The flotation tubes 8 are substantially continuous along the total length of the boom, except for less than one-fourth inch of space (less than 1 percent of the length of section 1) between the tubes of contiguous sections, thereby providing a uniform configuration and stability along the entire length of the total boom regardless of the total length of the boom, which will vary with the use.

In order to further increase stability, vertical plastic ribs 18 of between 90 Shore A scale and 40 Shore D scale durometer hardness are located at 6 foot intervals along the boom. The stiffness of the ribs closely maintains the relative position of the dam 6 and tubes 8, thereby also closely maintaining the relative position of the center of gravity 14 and center of buoyancy 12. If the above or below water segments of the dam 6 were to bend under the force of water, wind or other pressures, both the center of gravity 14 and the center of buoyancy 12 would shift to points resulting in lower stability. The ribs 18 extend from a point at the bottom edge of one side of the dam 6 vertically upward, against the dam 6, around tube 8, upward against the dam 6, over the top of the dam 6 in a hand-sized loop 22, downward on the opposite side of the dam 6, around tube 8 and on down to the bottom edge of the dam 6 opposite the starting point. The rib 18 is bonded, sealed, or otherwise tightly fastened against the dam in order to provide a semi-rigid stiffener and to serve other purposes which are described subsequently. The cross-section at any point of the rib 18 is generally of a half-round shape with a base no less than 1 inch and a radius of no less than one-half inch or of a rectangular shape with a base of no less than 1 inch and a width of no less than one-quarter inch, or of similar cross-sectional shape. In the caase of rectangular ribs, the outside edges are beveled to provide fairing.

In order to further increase stability additional weight is generally added internally within the lower portion 20 of the dam 6 by adding lead or similar weighting materials near the bottom edge of the dam. The result of adding weight is to lower the center of gravity 14, thereby yielding an even larger righting moment. The addition of weight to the lower part 20 of the dam 6 is possible because of the significant amount of reserve buoyancy which the configuration has, generally in the 6 pounds per liner foot range for a 3 foot dam.

The relationship of weight and buoyancy is such that in use, at least 50 percent of the height of the tubes 8 will be submerged, providing excellent stability.

The invention also includes a generally elliptical opening 22 approximately 1 × 3 inches as an integral part of the rib 18 and extending above the dam 6. The purpose of this feature is to provide a unique handling point for grasping with one's hand, for tying off lines or ropes of boats, or various equipment used in the vicinity of the invention, and for inserting long sections of pipe, wood or metal bars which can be used to lift or handle sections of the boom.

Another feature of the invention is the configuration and structure of the foam 224 which fills tubes 8. The foam 24 is shaped to closely conform to the heavy outer material of each tube 8. This characteristic of the invention helps to maintain the shape of the tubes 8 which is essential to the stability of the invention. Furthermore, the foam 24 is composed of a highly resilient, closed cell, flexible plastic material which is essentially non-water absorbent, thus preventing absorption of water within tubes 8 and consequent loss of buoyancy and stability.

Figure 6:
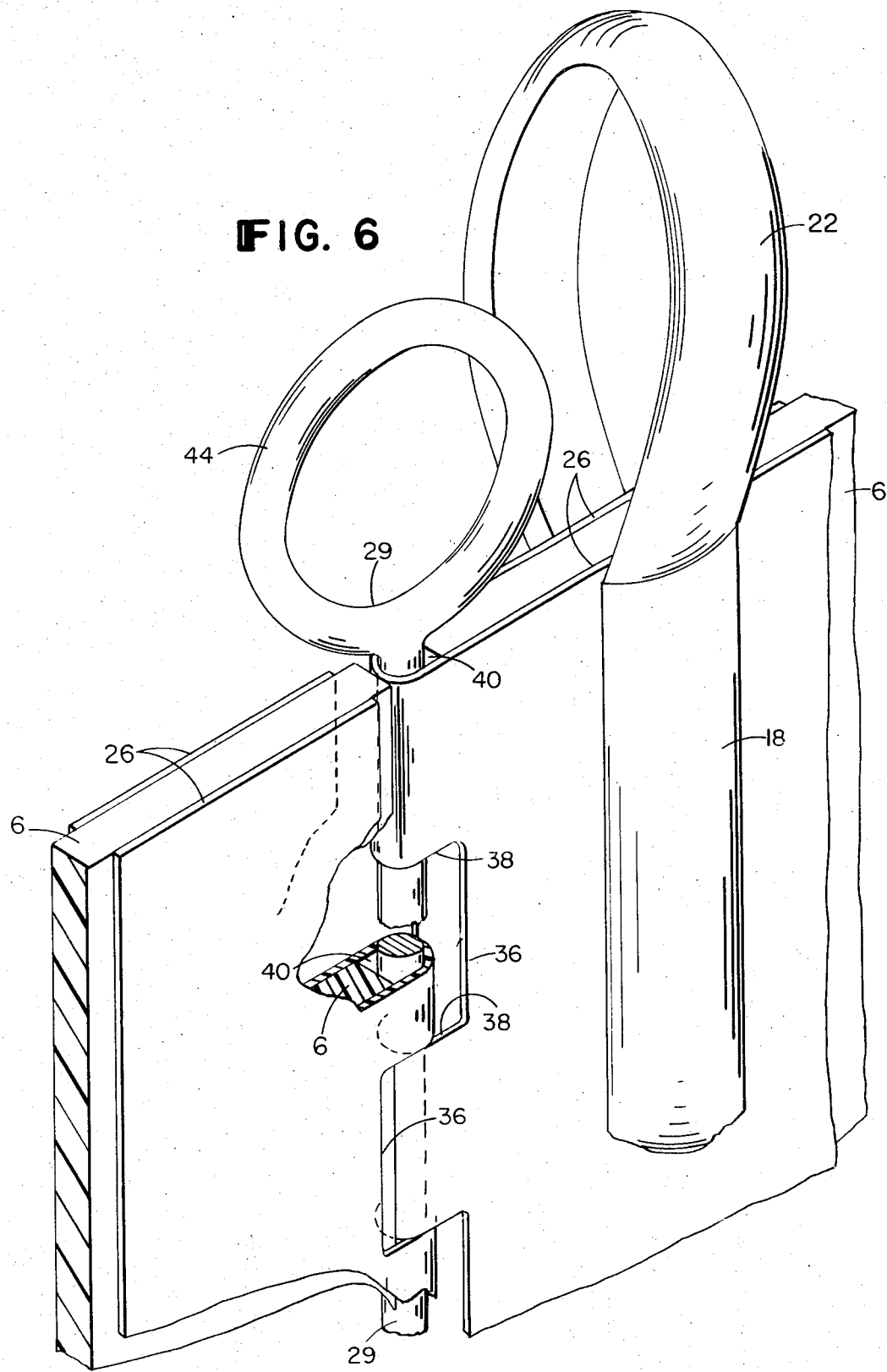
FIG. 6 is an isometric view broken away showing the detail of the boom section joiners and pin as well as part of a vertical stiffening rib.

Another important feature of the invention related to stability is the balanced resiliency and rigidity of the materials employed. As has been noted, the maintenance of a semi-rigid cross-section of the boom and a consistent uniformity to the tubes 8 is important to the stability of the configuration. Nevertheless, the configuration must also be resilient enough to withstand and absorb the shock of forces acting to distort the boom and resilient enough to return it to the original shape and resultant stability. Forces acting upon the boom include waves crashing against the boom, the continuous motion of the boom as it rides over waves and swells, currents acting upon the boom, ship overboard discharges striking the boom, wind, ships or boats striking the boom, debris striking or piling up against the boom, ice entrapping the boom, ice floes or cakes colliding with the boom, the booms rubbing against or striking pilings, piers, bulkheads, or overhead obstructions, and other similar forces and conditions encountered in the water environment. The components and materials, which will be discussed in more detail subsequently, all have calculated degrees of tensile strength, durability, memory and resiliency which reasonably assure return to the basic shape regardless of expected forces acting upon the boom. Specifically, the dam 6 and shells of the tubes 8 are preferably composed of a highly resilient rubber or polyurethane-like formulation. The flotation material within tubes 8 is composed of a highly resilient and flexible polyurethane or similar type foam. The ribs 18 are composed of a highly resilient polyurethane type material as are the section joiners 26 (FIG. 6). Each of the components of the invention has an inherent toughness, resiliency, and memory of varying degrees which individually and collectively assure maintenance of the basic cross-sectional and longitudinal configuration as illustrated in FIGS. 1 through 5. No metal, with the possible exception of minor accessories, and weighting, is used in the boom since most metals will not return to their original shape when subjected to extreme forces and chain or cable could foul ship propellers or shafts. Any material which would take a "set" different from the basic cross-configuration, might adversely affect the stability of the boom.

Another aspect of the invention which can lower the center of gravity and thereby further increase the stability of the configuration is the incorporation of microfine or larger particles of lead or a similar heavy material in the actual formulation of the dam 6 but preferably only in the bottom of lower 20 percent of the dam 6. The lead can be added to the lower 20 percent of the dam 6 during the final molding or casting operation before final curing takes place. Lead pellets or other heavy metal pellets can also be added in a similar manner prior to final curing. The center of gravity 14 can be lowered further by reducing the specific gravity of the upper one-third 28 of the dam 6.

The basic materials, components, and configurations of the invention provide the qualities necessary to guarantee the endurance of the boom in the sea environment for an extended period of time, generally in excess of two years.

The dam 6 and heavy outer shell of the tubes 8 are preferably composed of not less than one-fourth inch thick solid (i.e., rather than woven fabric) ethylene propylene, polyurethane, or similar material based formulations having the following characteristics:
  high tensile strength
  high tear strength
  between 60 and 90 Shore A scale durometer hardness
  specific gravity greater than 1.2
  ozone resistance
  cold resistance to at least −20°F.
  hydrocarbon resistant
  general chemical resistance
  fire retardancy
  abrasion resistance
  internal and external anti-fouling materials
  The ribs 18 are preferably composed of a polyurethane formulation having all of the characteristics above except that the durometer is between 90 Shore A scale and 40 Shore D scale. The boom section joiners 26 and pins 29 are preferably composed of a similar material. The difference in durometer between these components and that of the dam 6 and tubes 8 is particularly important to the balanced flexibility of the invention. specifically, the dam 6 and tubes 8 must be capable of flexibility to conform to water motion while the ribs 18 must be rigid enough to maintain the cross configuration yet yield to traumatic pressures and to have the plastic memory to return the system to the design configuration when such pressure ceases.

The foam 24 is preferably composed of a polyurethane formulation having the following characteristics:

density of less than 4.0 pounds per cu. ft.
  flexible closed cells
  non-water absorbent
  non-hydrocarbon absorbent
  non-biodegradable
  The tubes 8 are bonded to the dam 6. They may also be cast or molded as an integral part of the configuration. Likewise, the ribs 18 and boom section joiners 26 are bonded to the dam 6 and tubes 8. The tubes 8 as well as the ribs 18 and section joiners 26 may also be cast or molded as an integral part of the cross-configuration. Additionally, the ribs 18 may be located internally as a part of the basic dam and tube configuration, rather than being positioned on the exterior.

The unique fairing or smoothness of the entire boom is also an important aspect of the invention's suitability for its water environment. Specifically, the tubes 8 are essentially continuous throughout the entire length of the assembled boom with epoxy, cast or molded fillets, fairing them to the dam 6 and ribs 18. Rubberlike plugs 32 or solid ends 32 of the tubes 8 at the ends of each boom section are set so that a close butting occurs when sections are joined with the section joiner 26 described subsequently.

Furthermore, the half-round cross-section of the ribs 18 provides a smooth fairing longitudinally along the entire boom. As a result of the smooth fairing of the entire boom and its components, debris, oil, lines, cables, pilings, small boats, flotsam and similar materials or structures common to water surfaces and ship berthing facilities will not foul, catch, accumulate upon, or otherwise interfere with the containment function of the boom. Also, the smooth fairing facilitates clean-up and removal of debris, oil or other floating substances which are stopped by the boom. The smooth fairing also facilitates the towing of the boom through the water.

Figure 1:
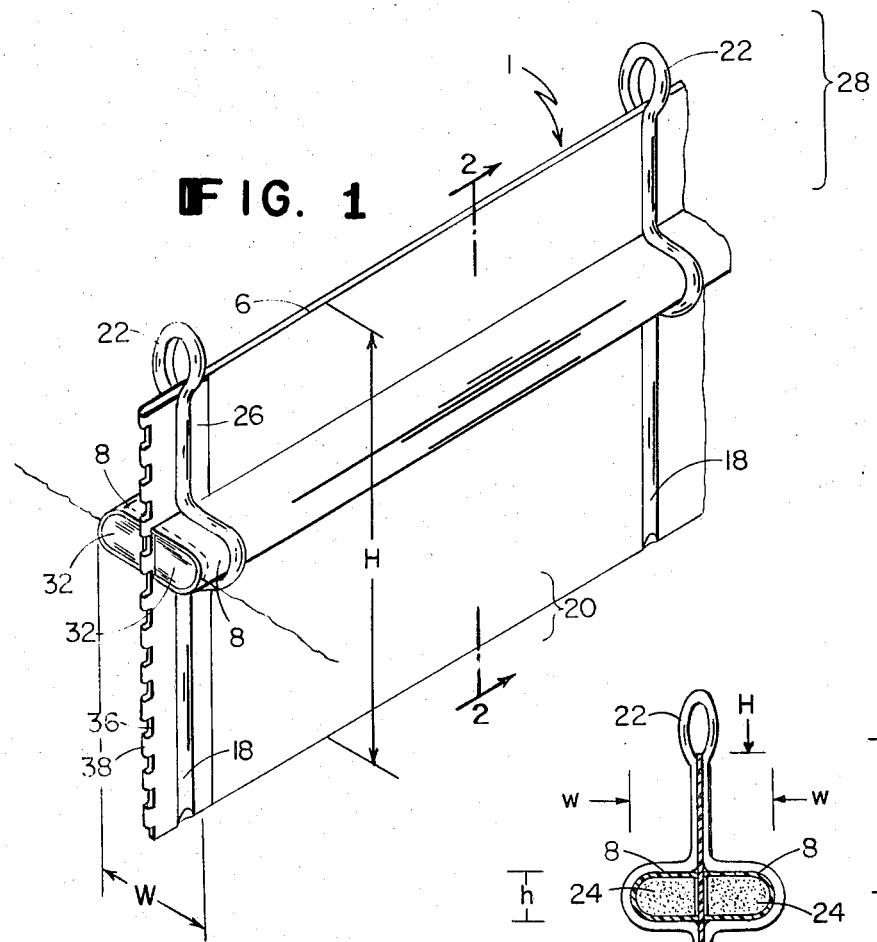
FIG. 1 is an isometric view of part of the invention showing one end of a boom section with the section joiner.
Figure 2:
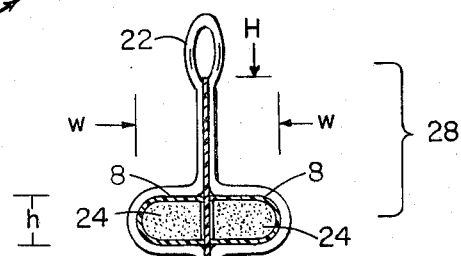
FIG. 2 is a sectional view through 2—2 of FIG. 1.

As illustrated in FIGS. 1 and 6, the invention utilizes a boom section joiner 26 formulated of the materials previously described. The purpose of the joiners 26 is to provide a flexible, quick joining and releasing method which is compatible with the environmental requirements and the overall characteristic and design of the invention.

The joiner 26 utilizes a hinge-like plastic fitting which is attached to the ends of each dam section, to one end of the sliding roller end plate 34 (FIG. 7), or to other components which are to be connected to the basic boom sections. The hinge plate 26 is folded around the end of the dam 6 and bonded to the dam. Close tolerance openings 36 are cut, cast or molded into the plate 26 with a vertical separation between hinge projections 38 of generally greater than one inch and a hole 40 through the projecting piece 38 preferably one-fourth inch or greater in diameter. There are right and left hand joiners 26 which when joined bring the sections or components closely together in the same plane vertically and horizontally. The snugging of joiners 26 as pin 29 is inserted provides a close fit which prevents oil or other contained materials from leaking or passing through the joined sections of boom or its components.

The joiner pin 29 has an eye 44 at the top which has a diameter of more than two inches so that it provides a two-finger hold to ease insertion of the pin. The eye 44 also serves as a lifting point for a boat hook, fingers, lines, or similar devices which are used to quickly remove the pin. This feature enables the boom to be separated quickly and easily from the deck of a tow boat, other vessel, or from a pier when operational requirements so demand.

In order to assure positive and continuous containment capability over extended periods of time, the invention incorporates various connecting and positioning devices which assure proper function of the boom.

Figure 7:
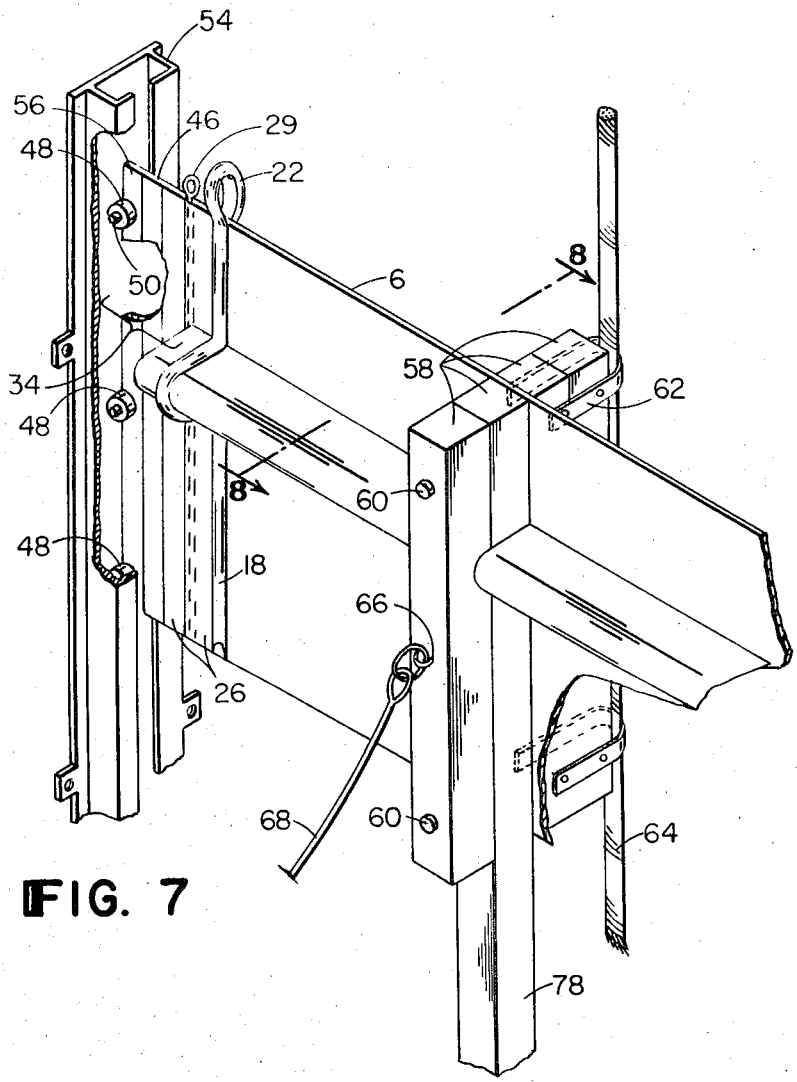
FIG. 7 is an isometric view of the bitter end of the boom, connected in a fixed channel and a typical strongback.

FIG. 7 illustrates the principal method of connecting the extreme ends of the boom to a pier, piling, bulkhead or similar structure at which the ends of the boom terminate. A roller end plate 34 generally serves this function. The center plate 46, generally made from fiberglass reinforced polyurethane, has the standard section joiner plate 26 on one end. The other end incorporates six polyurethane molded or cast anti-fouling treated rollers 48, three on each side of the center plate 46. Each set of two rollers 48 is loosely fit on a monel or stainless steel type shaft 50 or axle and held in place by monel or stainless steel type snap rings and washers.

A strengthening plate 56 may be used to hold the axles 50 and sandwich the center plate 46 between.

The roller end plate moves within a welded, extruded, or similarly fashioned channel bar 54 usually made of galvanized iron and generally coated with anti-fouling treated polyurethane.

The rolling end plate 34 and channel 54 combination provide for vertical movement of the boom with tide and wave motion. The abrasion and bearing qualities of polyurethane and similar materials as well as the anti-fouling treatment enable the rolling end plate 34 to function in an unrestricted, free manner for extended periods of time in the sea environment.

Figure 8:
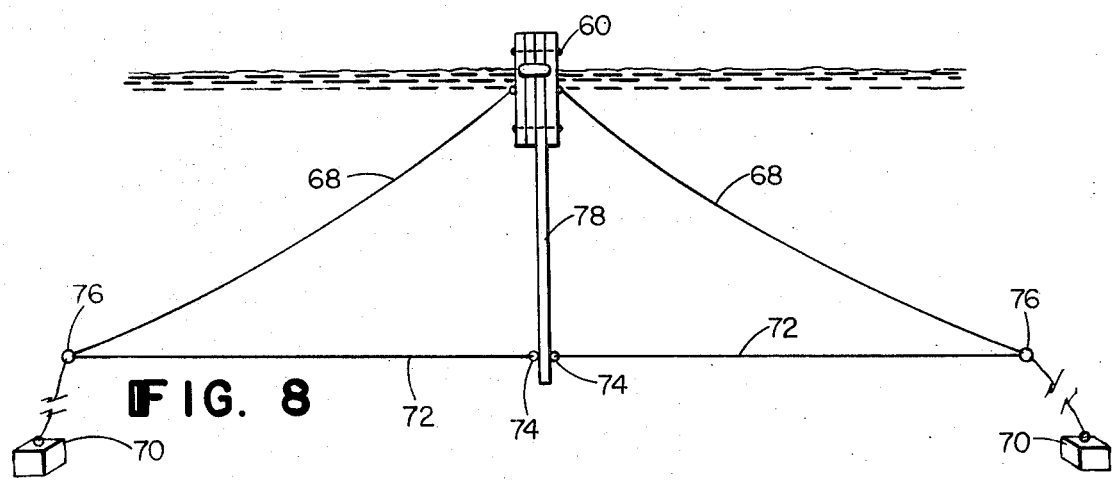
FIG. 8 is a sectional view through 8—8 of FIG. 7.

As illustrated in FIGS. 7 and 8, timber strongbacks 58 composed of anti-fouling treated wood serve as attachment points for various mooring systems. Generally, the boom is sandwiched between the paired timbers by means of large galvanized bolts 60. One typical installation utilizes galvanized iron bands 62 bolted to one side of the strongback 58 structure to attach the boom to vertical cables 64 usually attached to or suspended from a pier to large concrete blocks at the bottom end of the cable 64 well below the water surface at mean low water. The cable 64 and block provide a positioning device for holding the boom in position under or close to a pier particularly where high cross currents are present.

A second type of strongback 58 provides a strong mooring point for portions or a whole boom in open water. One variation attaches the primary mooring line 68 to point 66 on the strongback located slightly below the water line. In this case as with the vertical cable 64 mooring system, the strongback 58 is vertically the same height as the dam 6. In a second variation one of the strongback timbers extends approximately three times the height of the dam beneath the boom, an extended strongback 78. A primary mooring cable 68, is attached to one or both sides of the strongback at a point 66 close to its center and sloping to the mooring block 70 or anchor on the bottom with a scope or ratio usually more than three times the length of the mooring line 68 to the depth of water. A bridle 72 is connected from an eyebolt 74 at the bottom of the extended strongback 78 approximately horizontally to a point or ring 76 on one or both of the primary mooring lines 68. The extended strongback moor may be used in very high current situations to assist in maintaining the stability and positioning of the boom.

All or parts of the invention previously described can be assembled in a wide variety of combinations to provide unique permanent protection against oil or chemical spills and pollution, capable of surviving the often hostile environment for long periods of time without failure, and without significant handling or maintenance costs. The data previously recorded outlines the qualities of the invention which enable it to fill the need for survival in the water environment for extended periods of time in order to provide a dependable barrier and total containment system at any time when pollutants are spilled into or appear upon the waters. Typical examples of applications are sea lanes; permanent enclosures for vessels, oil rigs, tank farms, refineries, treatment plants, etc.; protection for recreational beaches; pier enclosures; and the like.

Other embodiments are within the following claims.

What is claimed is:

1. A floating barrier section comprising
a vertical dam at least one-fourth thick constructed of solid material having Shore A scale durometer hardness between 60 and 90 and resiliently deformable in all directions, and
floats extending laterally from opposite sides of said dam below the top thereof, said floats being D-shaped in cross-section providing curved outer edges and of overall width between one-fourth and two-thirds the height of said dam, said floats extending continuously along the length of said section to provide strength and continuity for said dam,
each said float having an outer shell resiliently deformable in all directions,
said barrier section providing resiliently stretchable upper and lower dam edges, and
at least one vertical stiffening rib of resiliently deformable plastic material, said rib extending externally of and transverse to said dam,
said entire barrier section being resiliently deformable in all directions, and being free from cables, lines and chains.

2. The barrier section of claim 1 wherein said dam has an increased average weight density in the lower 20 percent of its vertical extent.

3. The barrier section of claim 2 wherein said material includes composition with which is mixed metal particles in at least a portion of said lower 20 percent.

4. The barrier section of claim 1 wherein at least one of said timbers extends below said dam for attachment of a mooring bridle.

5. The barrier section of claim 1, said floats further comprising resilient foam material having a density of less than 4 lbs. per cubic foot contained within said outer shell.

6. The barrier section of claim 1, said rib extending around said floats and being fixed to dam both above and below said floats.

7. The barrier section of claim 1, said rib being extended above said dam to provide a said handle.

8. A floating barrier section as claimed in claim 1 wherein
at least one end of said sections is constructed and arranged for connection to an adjacent said section, being formed with spaced projections each having a vertical opening for receiving a hinge pin, projections of adjacent sections being staggered for close-fitting interlocking to provide a hinged connection, said projections being of plastic material.

9. A multiple section floating barrier comprising
a series of barrier sections as claimed in claim 8, and a plurality of hinge pins,
said spaced projections of said two adjacent sections being interlocked and held in place by a hinge pin.

10. A floating barrier section comprising
a vertical dam at least one-fourth inch thick constructed of solid material having Shore A scale durometer hardness between 60 and 90 and resiliently deformable in all directions, and
floats extending laterally from opposite sides of said dam, said floats being D-shaped in cross-section providing curved outer edges and of overall width between one-fourth and two-thirds the height of said dam, said floats extending continuously along the length of said section to provide strength and continuity for said dam, each said float having an outer shell resiliently deformable in all directions, said barrier section providing resiliently stretchable upper and lower dam edges, said barrier section providing attaching means for attaching said section to a fixed vertical surface while permitting vertical motion of said section, said attaching means comprising a generally closed vertical channel adapted to be secured to a fixed vertical surface and providing a vertical slot and a pair of interior parallel vertical bearing surfaces, a roller confined within said channel and secured to said dam, and having a plane of rotation parallel with said dam, its rolling surface in contact with a said bearing surface, said dam extending through said vertical slot and substantially closing said channel.

11. The floating barrier section of claim 10 having a pair of said rollers secured to opposite sides of said dam.

12. A floating barrier section comprising a vertical dam, and floats extending laterally from opposite sides of said dam, said floats being of overall width, taken together, between one-fourth and two-thirds the height of said dam and greater than their own height, said dam being constructed of a solid material having Shore A scale durometer hardness between 60 and 90 and thus providing its own tensile strength, said barrier section having its center of gravity below its center of buoyancy, and having at least one end constructed and arranged for connection to an adjacent said section, said barrier section further comprising a plurality of vertical strongback timbers secured to said section.

* * * * *

UNITED STATES PATENT OFFICE
CERTIFICATE OF CORRECTION

Patent No. 3,818,708      Dated June 25, 1974

Inventor(s) Robert A. Benson

It is certified that error appears in the above-identified patent and that said Letters Patent are hereby corrected as shown below:

Column 8, claim 4 should be dependent on claim 12.

Signed and sealed this 29th day of April 1975.

(SEAL)
Attest:

RUTH C. MASON
Attesting Officer

C. MARSHALL DANN
Commissioner of Patents
and Trademarks